(12) United States Patent
Mihály et al.

(10) Patent No.: US 10,218,620 B2
(45) Date of Patent: Feb. 26, 2019

(54) METHODS AND NODES FOR CONGESTION CONTROL

(71) Applicant: Telefonaktiebolaget LM Ericsson (publ), Stockholm (SE)

(72) Inventors: Attila Mihály, Dunakeszi (HU); Geza Szabo, Kecskemet (HU); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 15/310,622

(22) PCT Filed: Jul. 1, 2014

(86) PCT No.: PCT/SE2014/050824
§ 371 (c)(1),
(2) Date: Nov. 11, 2016

(87) PCT Pub. No.: WO2016/003332
PCT Pub. Date: Jan. 7, 2016

(65) Prior Publication Data
US 2017/0085483 A1    Mar. 23, 2017

(51) Int. Cl.
*H04L 12/801* (2013.01)
*H04L 12/851* (2013.01)
(Continued)

(52) U.S. Cl.
CPC ............ *H04L 47/12* (2013.01); *H04L 5/0055* (2013.01); *H04L 47/11* (2013.01); *H04L 47/24* (2013.01);
(Continued)

(58) Field of Classification Search
CPC ....................................................... H04L 47/12
See application file for complete search history.

(56) References Cited

U.S. PATENT DOCUMENTS 5,164,938 A * 11/1992 Jurkevich ............. H04J 3/1682
370/231
6,262,976 B1 * 7/2001 McNamara ............. H04L 45/00
370/254

(Continued)

OTHER PUBLICATIONS

Author Unknown, "Transmission Control Protocol," Darpa Internet Program, Protocol Specification, RFC: 793, Sep. 1981, 90 pages.
(Continued)

*Primary Examiner* — Andrew Lai
*Assistant Examiner* — Andrew C Lee
(74) *Attorney, Agent, or Firm* — Withrow & Terranova, PLLC (57) ABSTRACT

The disclosure relates to a method for handling congestion performed in a source node of a communication network. The communication network provides a communication path for traffic streams between the source node and a destination node, wherein the source node multiplexes two or more different types of traffic streams onto a single connection. The method comprises detecting congestion in the communication network along the communication path, determining whether there is a traffic differentiation in a network node along the communication path, and applying a connection-level congestion control for the case of determining that there is no network node performing traffic differentiation. The disclosure also relates to a source node, computer program and computer program product.

22 Claims, 3 Drawing Sheets

(51) Int. Cl.
*H04L 5/00* (2006.01)
*H04L 29/08* (2006.01)
*H04L 29/06* (2006.01)

(52) U.S. Cl.
CPC .............. *H04L 47/19* (2013.01); *H04L 67/02* (2013.01); *H04L 69/16* (2013.01)

(56) References Cited

U.S. PATENT DOCUMENTS

| | | | | |
|---|---|---|---|---|
| 6,496,478 B1* | 12/2002 | Choi | ................. | H04L 47/10 370/229 |
| 6,628,670 B1* | 9/2003 | Galand | ................. | H04L 45/02 370/409 |
| 6,826,620 B1* | 11/2004 | Mawhinney | ............ | H04L 47/10 370/235 |
| 7,535,842 B1 | 5/2009 | Venables et al. | | |
| 7,688,725 B2 | 3/2010 | Sami et al. | | |
| 8,614,949 B2 | 12/2013 | Hosein | | |
| 2003/0063564 A1 | 4/2003 | Ha et al. | | |
| 2004/0252700 A1* | 12/2004 | Anandakumar | .. | H04L 29/06027 370/395.21 |
| 2005/0030952 A1* | 2/2005 | Elmasry | .............. | H04L 43/0829 370/395.2 |
| 2006/0015639 A1* | 1/2006 | Taylor | ................. | H04L 41/0896 709/235 |
| 2007/0070916 A1* | 3/2007 | Lehane | ................... | H04L 43/18 370/252 |
| 2007/0115814 A1* | 5/2007 | Gerla | .................... | H04L 1/0002 370/230 |
| 2007/0133419 A1* | 6/2007 | Segel | ................. | H04L 47/10 370/236 |
| 2007/0153695 A1* | 7/2007 | Gholmieh | .......... | H04L 43/0882 370/235 |
| 2007/0248013 A1 | 10/2007 | Sridharan et al. | | |
| 2008/0056125 A1* | 3/2008 | Kneckt | ................... | H04L 41/00 370/229 |
| 2008/0144503 A1 | 6/2008 | Persson et al. | | |
| 2009/0067335 A1 | 3/2009 | Pelletier et al. | | |
| 2011/0205898 A1* | 8/2011 | Ichiki | ..................... | H04L 45/00 370/235 |
| 2012/0230186 A1* | 9/2012 | Lee | ........................ | H04L 43/028 370/230 |
| 2014/0269893 A1* | 9/2014 | Parikh | ................. | H04L 29/0651 375/240 |
| 2015/0009826 A1* | 1/2015 | Ma | .................... | H04W 28/0268 370/235 |
| 2015/0146615 A1* | 5/2015 | Yu | ......................... | H04L 5/0032 370/328 |
| 2016/0112896 A1* | 4/2016 | Karampatsis | ..... | H04W 28/0252 370/230.1 |
| 2016/0182255 A1* | 6/2016 | Liu | ..................... | H04L 12/4645 370/254 |

OTHER PUBLICATIONS

Balakrishnan, Hari, et al., "TCP Behavior of a Busy Internet Server: Analysis and Improvements," Proceedings of the Seventeenth Annual Joint Conference of the IEEE Computer and Communications Societies, Mar. 29-Apr. 2, 1998, IEEE, pp. 252-262.

Belshe, Mike, et al., "Hypertext Transfer Protocol Version 2.0: draft-ietf-httpbis-http2-09," HTTPbis Working Group, Internet-Draft, Dec. 4, 2013, IETF Trust, 60 pages.

Cho, Soohyun, et al., "Collaborative Congestion Control in Parallel TCP Flows," IEEE International Conference on Communications, May 16-20, 2005, IEEE, pp. 1026-1030.

Roskind, Jim, "Quick UDP Internet Connections: Multiplexed Stream Transport Over UDP," Dec. 2, 2013, 49 pages.

Shpiner, Alex, et al., "Modeling the Interactions of Congestion Control and Switch Scheduling," 17th International Workshop on Quality of Service, Jul. 13-15, 2009, IEEE, 9 pages.

International Search Report for International Patent Application No. PCT/SE2014/050824, dated Sep. 29, 2014, 4 pages.

* cited by examiner

METHODS AND NODES FOR CONGESTION CONTROL

This application is a 35 U.S.C. § 371 national phase filing of International Application No. PCT/SE2014/050824, filed Jul. 1, 2014, the disclosure of which is incorporated herein by reference in its entirety.

TECHNICAL FIELD

The technology disclosed herein relates generally to the field of computer networking, and in particular to congestion control within computer networking.

BACKGROUND

Congestion control is a mechanism in a node of a data network, e.g. in an end-host, that regulates traffic flows generated by the node in order to avoid excessive packet losses, in turn causing excessive re-transmissions adding to the congestion. This is done in order to guarantee acceptable goodput, i.e. application level throughput, for all the traffic flows sharing a network resource, which has become a bottleneck. One typical example of such congestion control mechanism is the additive-increase/multiplicative-decrease (AIMD)-like congestion control behavior of Transmission Control Protocol (TCP) that ensures both fairly good link utilization and thus high goodput, and also that the traffic flows will share the bottleneck network resource in an approximately fair way. Other transport protocols, such as User Datagram Protocol (UDP), do not have congestion avoidance algorithms. In many cases, some adaptation to the congestion is done by applications run on the node.

There is a trend currently towards many different application streams sharing the same transport protocol. One example is the Web Real-Time Communication (WebRTC) application that multiplexes audio, video and data streams on the same UDP connection. Another example is the Hyper-Text Transfer Protocol (HTTP) 2.0 protocol currently under standardization that multiplexes many streams corresponding to different object transfers into the same Transport Layer Security (TLS)/TCP connection. Experimental transport protocol proposal have recently been put forward, which are also based on this multiplexing paradigm. In case of multiplexing, several streams of potentially different characteristics share the same connection.

SUMMARY

For transport protocols multiplexing different streams on the same connection, issues arise regarding the congestion control mechanisms. In general, a connection-level congestion control, e.g. provided by TCP, offers the highest efficiency, in particular having a single channel characteristics estimate for the whole connection, and lowest simplicity e.g. in the need of book-keeping only one set of parameters, e.g. one congestion window per connection. The connection-level congestion control is thus a good choice for combatting congestion in the network.

However, if the communication network does some traffic differentiation, i.e. treats packets of the different streams differently, a connection-level differentiation for the purpose of congestion control is no longer meaningful. Indeed, the result of differentiation is that the different streams, each e.g. undergoing a certain Quality of Service (QoS)-treatment at the bottleneck network resource, experience different congestion levels.

A transport protocol implementing a per-stream congestion control algorithm would thus be needed. However, this may be inefficient in view of network resources and it may also be cumbersome from a management point of view.

There is a need to address the above shortcomings, and to provide improved congestion control for such situations wherein different streams are multiplexed onto a single connection, in particular a congestion control that is perceived as fair and that is also efficient.

An object of the present disclosure is to solve or at least alleviate at least one of the above mentioned problems.

The object is according to a first aspect achieved by a method for handling congestion performed in a source node of a communication network. The communication network provides a communication path for traffic streams between the source node and a destination node, wherein the source node multiplexes two or more different types of traffic streams onto a single connection. The method comprises: detecting congestion in the communication network along the communication path; determining whether there is a traffic differentiation in a network node along the communication path; and applying a connection-level congestion control for the case of determining that there is no network node performing traffic differentiation.

The method provides a resource-efficient and proper congestion control for transport protocols multiplexing different streams. The method provides a congestion control that, in response to detecting that there is no traffic differentiation along the communication path, uses the most appropriate congestion control scheme for that case, which is connection-level congestion control.

In an embodiment, the method comprises applying a per-stream group congestion control for the case of a network node performing traffic differentiation, wherein a stream group comprises one or more traffic streams grouped together.

The object is according to a second aspect achieved by a source node of a communication network configured for handling congestion. The communication network provides a communication path for traffic streams between the source node and a destination node, wherein the source node is configurable to multiplex two or more different types of traffic streams onto a single connection. The source node is configured to: detect congestion in the communication network along the communication path; determine whether there is a traffic differentiation in a network node along the communication path; and apply a connection-level congestion control for the case of determining that there is no network node performing traffic differentiation.

The object is according to a third aspect achieved by a computer program comprising computer program code, which, when run on at least one processor, cause the at least one processor to carry out the method as above.

The object is according to a fourth aspect achieved by computer program product comprising a computer program as above, and a computer readable means on which the computer program is stored.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

First an elaboration is provided on the issues addressed earlier under the Summary section. For the case that a network does some traffic differentiation based on type of stream, a connection-level differentiation for the purpose of congestion control is, as mentioned, no longer meaningful. A traffic differentiation performed at a bottleneck may for example comprise giving different Quality of Service (QoS) treatments for the different types of streams. While being treated fairly in the sense of throughput in the congestion control of the source node, the streams undergo different treatment in the bottleneck, resulting in that the different stream groups experience different congestion levels at the bottleneck and thus also at the receiving end node.

As a particular example, a first stream comprising a voice stream and a second stream comprising data stream multiplexed on a single connection may be considered. If a bottleneck at which the multiplexed streams arrive treats the different streams in a traffic differentiated (prioritized) way, the different streams experience different congestion levels at the bottleneck. Priority may typically be given to the voice stream over the data stream, as speech is rather delay critical while data is often more delay tolerant, i.e. the streams could be given different QoS in terms of delay. Now, if the connection level congestion control is applied (e.g. by TCP), which is blind to the fact that the voice stream is prioritized over the data stream, then the voice stream would suffer as the congestion control at the source node would act to avoid the connection from being overloaded with traffic. This in turn means that the voice stream and the data stream are delayed equally at the source node, from which delay the voice stream suffers most. It is noted that this is just an example, and that traffic differentiation could, for instance, be noted in terms of throughput rather than delay.

Briefly, in accordance with an aspect of the present disclosure, the above is addressed by providing a per-stream group congestion control (or congestion avoidance behavior) for such cases. However, there may or may not be traffic differentiation at the congested network resource (bottleneck), depending e.g. on the destination node, congestion situation etc. A congestion control solution is therefore provided that is able to react to whether or not there is traffic differentiation among the streams in the communication network.

Traffic differentiation in the context of the present disclosure is when streams with different requirements are differentiated over a bottleneck based on their requirements. An example on such traffic differentiation is to queue the streams with different requirements in different queues and apply strict priority scheduling among these queues.

In an aspect of the present disclosure, the use of a congestion control mechanism in source node clients is provided that can react to traffic differentiation that is possibly used in the network. This congestion control mechanism resembles or exhibits the behavior of a connection-based congestion control in case there is no traffic differentiation in the bottleneck, while it exhibits a per-stream group congestion control behavior when there is traffic differentiation at the bottleneck.

Based on the characteristics of the streams within a connection, stream groups are created. Streams may be grouped together e.g. when those streams have similar QoS requirements. Further, the use of stream groups provides additional privacy to the end-user, since not even the number of streams has to be revealed to the network. It is noted that the method is applicable also in cases when all stream groups are contained as a single stream.

In an embodiment, both connection level congestion control and QoE aggregate level congestion control are provided based on whether there is traffic differentiation or if traffic differentiation may be suspected to exist in the network.

Figure 1:
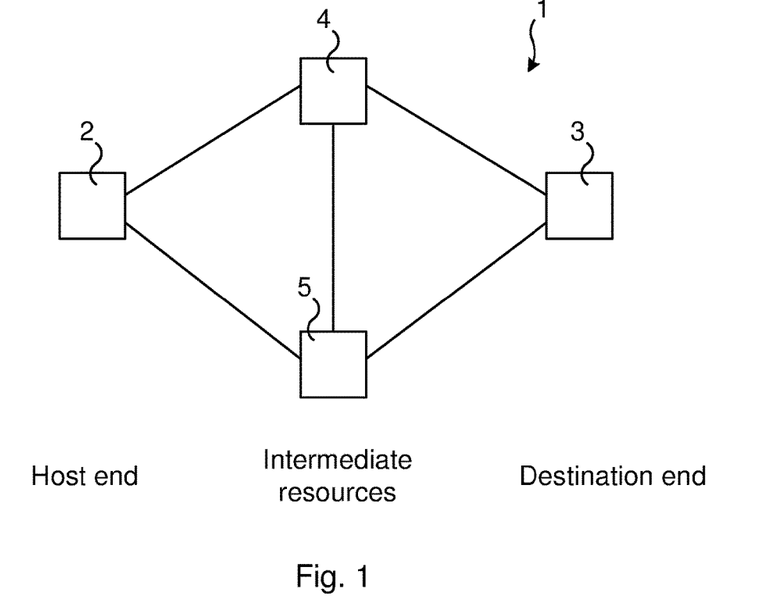
FIG. 1 illustrates schematically an environment in which embodiments of the present disclosure may be implemented.

FIG. 1 illustrates schematically an environment, in particular a communication network 1, in which embodiments of the present disclosure may be implemented. The communication network 1 comprises source nodes 2, e.g. comprising application programs providing certain services to users. As a particular example, the source node 2 may comprise a web server running applications to which users can connect and retrieve web pages stored therein. The source node 2 may be denoted in various ways, e.g. source end host, client, content provider. The present disclosure is mainly concerned with source nodes 2 that are configured to multiplex two or more different types of traffic streams onto a single connection.

The communication network 1 comprises destination nodes 3. The destination node 3 may for example comprise a computer (or other piece of equipment) of a user requesting a service provided by the source node 2. The destination node 3 may be denoted in various ways, e.g. destination end host, client.

The communication network 1 may further comprise a number of intermediate nodes 4, 5 comprising for example routers, switches, hosts or clients. The source node 2 and the destination node 3 are able to communicate with each other, either directly, or through any number of such intermediate nodes 4, 5. That is, the communication network provides a communication path for traffic streams between the source node 2 and the destination node 3. A connection between the source node 2 and the destination node 3 is a means over which various types of data transmission channels can be used for conveying data between the nodes 2, 3. The different streams of the single connection may for instance use the same intermediate resources, e.g. all streams going through intermediate node 4, or some streams may use different intermediate nodes than others, e.g. some streams using a first intermediate node 4 and another using a second intermediate node 5.

A congested network resource is a network resource that has a load such that its quality of service deteriorates, e.g. in terms of queuing delay or packet loss. Such congested network resource may for instance comprise a network node, a router, a data link, a switch etc.

In an aspect, the present disclosure provides an improved congestion control algorithm for use by transport protocols multiplexing different data streams on the same connection.

Figure 2:
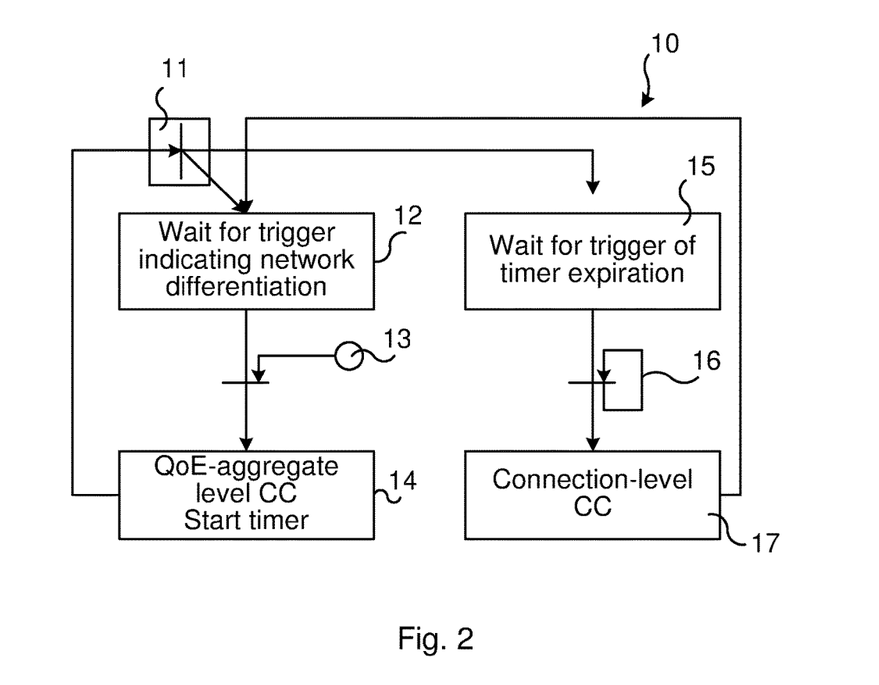
FIG. 2 is a flow chart illustrating an embodiment of the present disclosure.

FIG. 2 is a flow chart illustrating an embodiment of the present disclosure. In this embodiment, a switching between connection level congestion control algorithm and a QoE aggregate level congestion control algorithm is performed. This embodiment may be seen as a state based approach, which can change behavior based on triggers about packet reordering and/or packet loss rates.

A network node, e.g. the source node 2, implementing an algorithm 10 according to the flow chart, is able to adopt two different states. One state (box 17) represents a connection-level congestion control and the other state (box 14) represents a per-stream group congestion control. In the former, i.e. the connection-level congestion control all streams of a connection are limited by a single congestion control and within e.g. the sending rate or sending window allowed by that single congestion control, the streams may be treated differently by the source node 2. The latter, i.e. the per-stream group congestion control, is in the following denoted Quality of Experience (QoE) aggregate level congestion control. One QoE aggregate comprises streams having essentially the same QoE, hence the QoE aggregate. A stream group, in the following also denoted stream aggregate, thus comprises two or more streams e.g. having same QoE. QoE is a measure of a customer's experiences with a service, such as web browsing or TV broadcast, and for this (subjective) metrics such as e.g. user expectations, feelings and satisfaction is attempted to be measured. It is however noted that the streams may be grouped together based on other criteria e.g. the more objectively measured QoS. Changes between the states is triggered by triggers relating to network traffic differentiation (switching to per-QoE aggregate CC if there is network traffic differentiation) and expiration of a timer set to a selected time period, during which no new trigger has been observed.

The default state of the source node 2 may be the connection-level congestion control, since this is a more efficient congestion control compared to congestion control algorithms differentiating between traffic. When congestion is detected, this default state thus handles the congestion control, at least initially. The detection of congestion may be performed in any known manner, e.g. by monitoring queue sizes, packet drop rates, increases in packet delays etc.

At box 11, the source node 2 awaits one of two things to happen: either a trigger is received that there is a traffic differentiation at the bottleneck (reference numeral 13) or a trigger is received indicating that a timer has expired (reference numeral 16).

At box 12 the source node 2 awaiting a trigger that indicates that there is network traffic differentiation in the bottleneck is illustrated. When, at reference numeral 13, such trigger is received then the network node 2 switches state so that the QoE aggregate level congestion control (box 14) is instead used for handling the congestion situation. Further, a timer may be started and upon expiration thereof without receiving new triggers indicating traffic differentiation, the connection level congestion control is switched to and again used. The QoE aggregate level congestion control state is more complex and less efficient, e.g. in terms of resources and from a management point of view, than the connection-level congestion control. Therefore such timer may be used, whereby the QoE aggregate level congestion control state is used only when needed to solve the shortcomings occurring when traffic differentiation is used. The timer may be set based e.g. on the dynamics of the network 1, and it is noted that oscillations between the states should be avoided. It may for instance be more advantageous to use the QoE aggregate level congestion control for a longer time period in order to avoid such oscillations.

At box 15 the source node 2 awaiting a trigger that indicates that the timer has expired is illustrated. When, at reference numeral 16, such expiration of time trigger is received then the network node 2 switches state (back) to the connection-level congestion control.

This algorithm or method 10 may then be repeated e.g. continuously until the congestion situation has been resolved.

It is noted that the above algorithm works well also for the case that all different sub-streams fall within a single group, e.g. each sub-stream having the same QoS requirement.

A few exemplary triggers indicating network traffic differentiation are described in the following.

A first trigger that may indicate network traffic differentiation comprises packet reordering between the different streams multiplexed onto the single connection. The traffic differentiation may result in re-ordering of packets belonging to different stream aggregates. Thus, observing packet reordering is a good indication that traffic differentiation is used at the congested network resource. The ordering of packets sent in a connection is in general reflected by some type of packet sequence numbers, wherein a packet sent earlier has a lower sequence number than a packet sent later. A re-ordering in the destination node 3 may thereby be identified. The destination node 3 may include the fact of re-ordering in acknowledgment (ACK) packets sent to the source node 2 (the sender). This embodiment thus requires that the destination node 3 implements a new type of ACK packet, or includes an information element in the ACK packet informing the sender (the source node 2) about the occurrence of a re-ordering.

In an alternative embodiment, the reordering is identified by looking at the sequence numbers of the ACKs received (assuming the ACKs are not differentiated and thus re-ordered). That is, the source node 2 knows the sequence numbers, assuming for example that a first sub-stream has sequence numbers 10, 12, 14 and a second sub-stream has sequence numbers 11, 13. If the ACKs received are in the order 10, 12, 14, 11, 13, this could be an indication of that traffic differentiation is made in the congested network resource, wherein it prioritizes the first sub-stream. Further, also other ordering of the ACKs may indicate traffic differentiation being made, e.g. packet order 10, 12, 11, 14, 13 for the given example could be an indication of traffic differentiation. This embodiment does not require changes to the destination node 3, however it may be more difficult to design a stable algorithm detecting the reordering compared to the previous embodiment.

There is possibility for traffic differentiation occurring also when there is no reordering as above, e.g. when using different Active Queue Management (AQM) in the bottleneck for the different streams in the same queue. In AQM, the bottleneck drops or arbitrarily reorders packets before its queue is full. In case of AQM, the packet loss ratios relative to the different streams or stream aggregates may be a good indication of the differentiated treatment of the streams. For example, a first stream may experience a packet loss of one of ten sent packets, i.e. 10%, while a second stream may experience a packet loss of only one of hundred packets, i.e. 1%, as detected in the source node by the ACKs for the respective streams. This difference in packet loss rate may thus be an indication on the streams being treated differently in the bottleneck. Another example of a trigger indicating traffic differentiation may be based on this type of comparison.

The congestion control mechanisms in the two states are described next, i.e. the connection-level congestion control and the QoE-aggregate level congestion control.

The connection-level congestion control may be similar to existing ones used in current transport protocols, and may e.g. comprise a self-clocking (window-based) congestion-control, similar to that of TCP. Mechanisms for improvements like those suggested in the QUIC design, e.g. packet pacing based on the measured bandwidth, may also be applied. When connection level congestion control is used, then stream scheduling within the connection should also be allowed. That is, a scheduler of the source node 2 in which aspects of the present disclosure is implemented should be able to schedule the packets of the streams, e.g. according to known scheduling algorithms, such as for instance Round Robin (RR), Weighted Fair Queuing (WFQ), strict priority etc.

The QoE aggregate level congestion control may also re-use existing congestion control schemes, and may for example comprise re-use of congestion control of TCP versions or any TCP friendly rate based congestion control. In the QoE aggregate level congestion control, each group of sub-streams has a certain QoE (or other parameter by means of which the sub-streams are grouped) and the congestion control is performed individually for each group, thereby adapting the congestion control to a traffic differentiation in the bottleneck of the network. In some embodiments, the aggressiveness of the QoE aggregate level part can be tuned according to the requirements of that QoE aggregate. For instance, aggressiveness in terms of additive increase speed may be tuned in an AIMD algorithm. Another metric of aggressiveness may for instance comprise the relative resource share for a flow in a stabilized network.

In another embodiment of the present disclosure both the connection level and QoE aggregate level congestion control methods are prepared for, in contrast to the previous embodiment that switches between the congestion control methods and applies them when needed. In this embodiment, the connection level congestion control and the QoE aggregate congestion control can be run in parallel, be compared to each other in view of current network situation and then select the more appropriate one.

In this embodiment a congestion control mechanism is thus used that calculates parameters needed for the congestion avoidance algorithms for both cases, i.e., both for the connection-level and the aggregate level congestion control. This may for example comprise calculating the would-be congestion windows. Then, the congestion avoidance algorithm that is most dominant, e.g. in view of throughput, for the given situation is applied.

The aggressiveness of the congestion control is set such that the congestion control for the total connection, i.e. the connection level congestion control, results in a higher data volume than the congestion control for the aggregate streams, i.e. the aggregated stream level congestion control, in case there is no traffic differentiation. The congestion control that results in the highest data volume to be transferred from the source node 2 is then selected, while keeping this criterion fulfilled. The connection level congestion control may be used as default congestion control, and is according to the present disclosure used whenever there is no traffic differentiation in a congestion situation (or no reason to suspect that there is). The applying of the aggressiveness setting may result in that the connection level congestion control is sometimes used also when there is traffic differentiation.

A respective aggressiveness parameter, e.g. the speed of additive increase in octets per round trip time (RTT), is set for the connection level congestion control and the aggregate level congestion control. The aggressiveness parameter for the aggregate level congestion control comprises an aggregate aggressiveness of all per aggregate stream congestion controls. For example, if there is a first and a second aggregate stream multiplexed onto a single connection then the aggressiveness parameter for the aggregate level congestion control comprises an aggregate of a first aggressiveness parameter of the first aggregate stream and a second aggressiveness parameter for the second aggregate stream.

The most appropriate congestion control is thus selected, depending on which would allow e.g. higher sending rate at the source node 2. For example, when a lower priority aggregate stream gets a smaller bandwidth share at the bottleneck and thus higher packet loss, the higher priority aggregate stream will not experience this packet loss, and consequently their aggregate stream congestion control will not e.g. reduce its bitrate or congestion window, while both the aggregate level congestion control and the connection-level congestion control will detect the traffic differentiation. After a while, the sum of the per stream congestion controls will allow higher sending rate than the connection level congestion control, and then the aggregate level congestion control is switched to.

Figure 3:
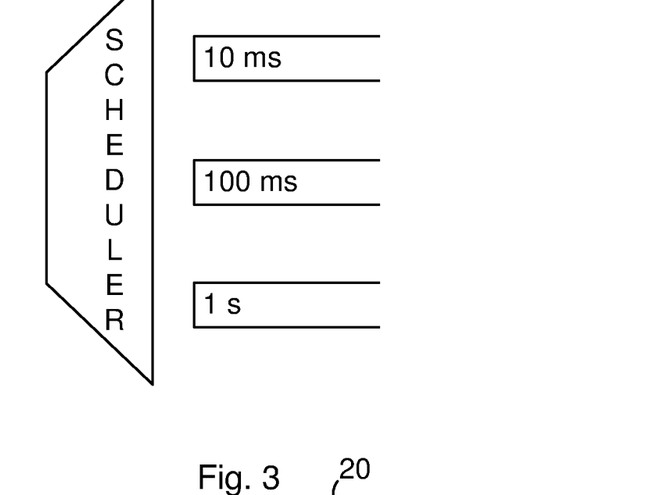
FIG. 3 illustrates an exemplary case of network traffic differentiation.

FIG. 3 illustrates a particular example of applying this embodiment, in particular illustrating an exemplary case of network traffic differentiation. Assuming for example a case wherein there are three different QoE aggregates, a first aggregate comprising streams having a delay requirement of 10 ms, a second aggregate comprising streams having a delay requirement of 100 ms and a third aggregate comprising streams having a delay requirement of 1 s delay requirement, respectively. Traffic differentiation in the communication network 1 may be based on a scheduling where the three aggregates are placed in different buffers with different delay thresholds, as shown in FIG. 3. In this example it is further assumed that a window-based congestion control mechanism is applied by the transport protocol at the source node 2.

Exemplary parameters that may be calculated in this case comprise:
  The overall window size W (calculated based on the overall packet losses experienced)
  The average round-trip time for the packets, RTTavg,
  The window sizes Wi for the different aggregates i=1,2,3
  The average RTTs for the different aggregates, RTTi,avg
  A logic for selection of the different congestion control methods is as follows:
  If W/RTTavg>sumi(Wi/RTTi,avg), then apply connection-level CC (based on W)
  Otherwise apply the aggregate-level CCs (based on Wi)
  It is noted that the above comparison is in fact a rate estimate comparison.

A condition for the above algorithm is, as mentioned, that the overall aggressiveness of the individual aggregate-level CC mechanisms is lower than or equal to that of the connection-level CC. That is, the resource share resulting from all the individual CC mechanisms should be at most as much as the resource sharing from the connection-level CC, when there is no differentiation by the network for the aggregate streams.

The above CC mechanism is more complex as the connection-level CC alone, it may also fall back to the connection-level CC after a while, as described earlier in relation to FIG. 2 for the algorithm 10. Instead of a timer, the switch may be based on the earlier experience, i.e., for how long has the connection-based CC been applied.

The embodiments described may all be improved by using explicit network information. In this case, rather than detecting traffic differentiation in the source node 2, the network communicates this directly. This may be performed via some packet markings, e.g. markings of synchronize (SYN) packets or the like. Alternatively, a signaling protocol such as Resource Reservation Protocol (RSVP) may be used.

However a network node providing traffic differentiation does not mean that the actual bottleneck of the flows is at that network node. So this trigger of explicit network signaling can be used to e.g. initiate the described methods in the source node 2. If it is known that all bottlenecks that can provide traffic differentiation also provide such signaling, then the source node 2 can be simplified: if the source node 2 does not receive any explicit signaling then the described methods do not have to be run. Such additional network signaling may thus simplify the transport protocol behavior, when traffic differentiation is not used.

Figure 4:
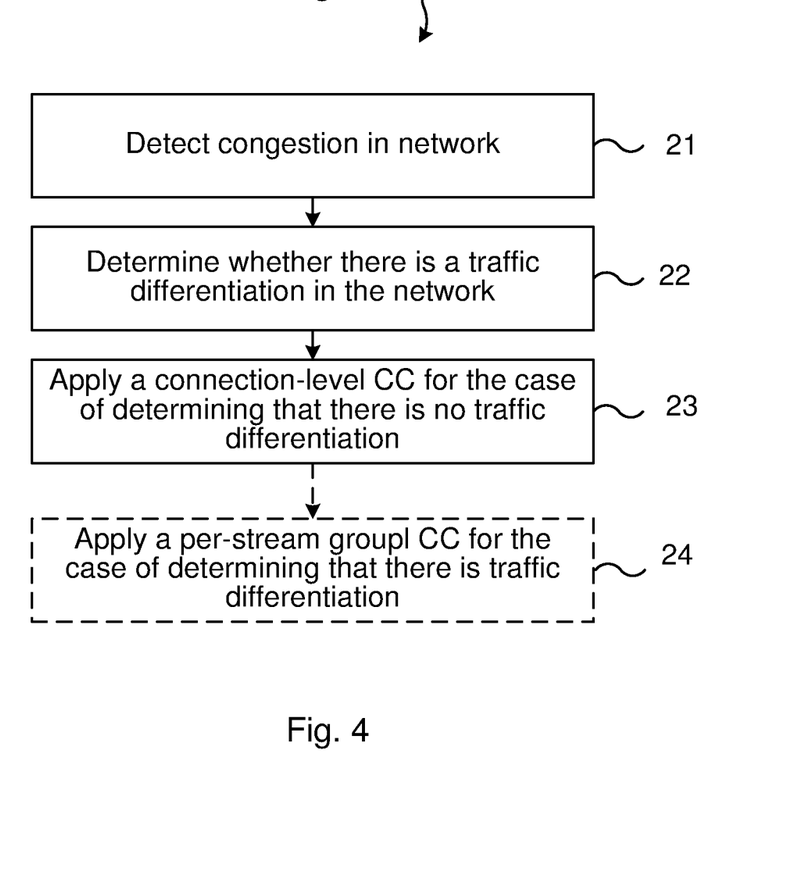
FIG. 4 illustrates a flow chart over steps of a method in a network node in accordance with the present disclosure.

The features that have been described may be combined in various ways, examples of which are given in the following. FIG. 4 thus illustrates a flow chart over steps of a method in a network node, in particular a source node 2.

A method 20 is thus provided for handling congestion performed in a source node 2 of a communication network 1. The communication network 1 provides a communication path for traffic streams between the source node 2 and a destination node 3, wherein the source node 2 multiplexes two or more different types of traffic streams onto a single connection. The single connection thus constitutes at least part of the communication path. The method 20 comprises detecting 21 congestion in the communication network 1 along the communication path. The detecting 21 of a congestion in the communication network 1 can be performed in any known manner, e.g. by monitoring queue sizes, packet drop rates, increases in packet delays etc. and determining the monitored value to be such as to indicate a congestion situation in the network.

The method 20 comprises determining 22 whether there is a traffic differentiation in a network node along the communication path.

The method 20 comprises applying 23 a connection-level congestion control for the case of determining that there is no network node performing traffic differentiation.

In an embodiment, the method 20 comprises applying 24 a per-stream group congestion control for the case of a network node performing traffic differentiation, wherein a stream group comprises one or more traffic streams grouped together. The method 20 thus comprises, in this embodiment, detecting 21 congestion in the communication network 1; determining 22 whether there is a traffic differentiation in a network node of the communication network 1; and applying 23 a first type of congestion control for the case of a network node performing traffic differentiation, in particular the per-stream group congestion control and applying a second type of congestion control for the case of no network node performing traffic differentiation, in particular the connection-level congestion control. The embodiment provides a resource-efficient and proper congestion control for transport protocols multiplexing different streams.

In an embodiment, the multiplexing comprises grouping the two or more different traffic streams into aggregate stream groups, each stream group requiring same or similar network handling. The network handling of packets being same or similar may be expressed in terms of quality of experience, or quality of service, or delay requirement, or the like.

In an embodiment, the determining 22 comprises receiving a trigger indicating use of traffic differentiation in a network node.

In a variation of the above embodiment, the trigger comprises a message from the destination node 3, the message identifying occurrence of a re-ordering of sequence numbers of packets of the connection compared to an expected ordering of the sequence numbers of the packets.

In an embodiment, the determining 22 comprises:
transmitting packets to the destination node 3,
receiving acknowledgment messages from the destination node 3 for the transmitted packets, and
detecting, based on sequence numbers of the acknowledgement messages, that the received acknowledgement messages arrive in an order other than the order in which the packets were transmitted.

In an embodiment, the determining 22 comprises detecting a difference between a packet loss ratio of a first type of traffic stream relative a packet loss ratio of a second type of traffic stream being above a threshold value.

In an embodiment, the applying 23 comprises using the connection-level congestion control as default congestion control and switching to a per-stream group congestion control upon determining that there is a traffic differentiation in a network node, wherein a stream group comprises one or more traffic streams grouped together.

In a variation of the above embodiment, the per-stream group congestion control is applied for a set period of time, and after the expiration of the set period of time the connection-level congestion control is again applied.

In an embodiment, the applying 23 comprises determining a respective aggressiveness parameter for the connection-level congestion control and for the per-stream group congestion control such as to provide higher throughput for the connection-level congestion control than for the per-stream group congestion control in case of no traffic differentiation, wherein the aggressiveness parameter for the per-stream group congestion control comprises an aggregate aggressiveness of all per-stream group congestion controls, and applying the congestion control giving the highest throughput.

In a first variation of the above embodiment, the connection-level congestion control is applied if giving a higher overall data rate for the streams than the per-stream group congestion control.

In a second variation of the above embodiment, the connection-level congestion control is applied if $$\frac{W}{RTT_{avg}} > \sum_i \frac{W_i}{RTT_{i,avg}},$$

wherein W comprises an overall window size calculated based on an overall packet losses experienced, RTTavg comprises the average round-trip time for packets of the two or more different traffic type streams, $W_i$ comprises the window sizes for different stream aggregates i, wherein a stream aggregate i comprises one or more traffic type streams grouped together, and $RTT_{i,avg}$ comprises the average round-trip time for packets of the different aggregates i.

In an embodiment, the determining 22 comprises receiving signaling from a network node indicating traffic differentiation being performed in the communication network 1.

Figure 5:
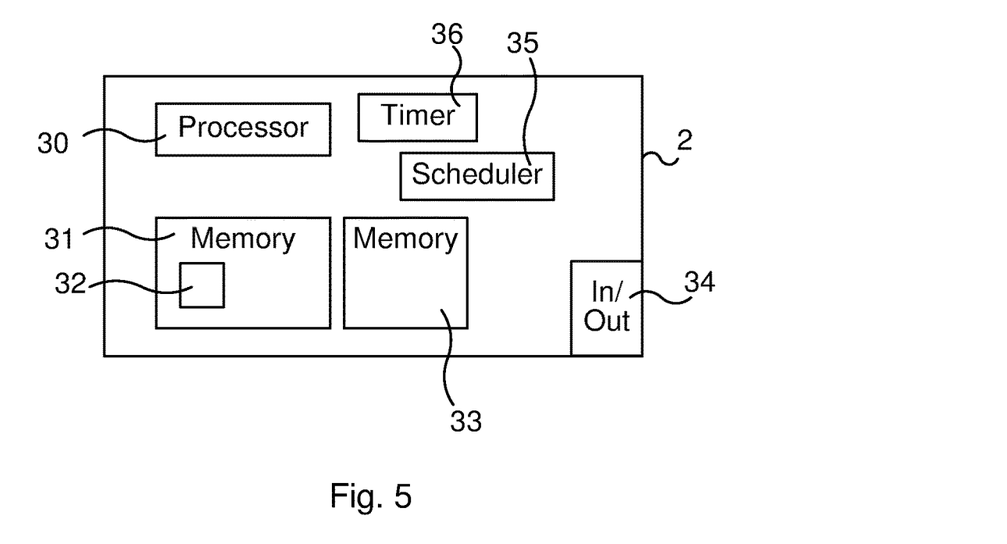
FIG. 5 illustrates schematically a network node and means for implementing embodiments of methods of the present disclosure.

FIG. 5 illustrates schematically a network node, in particular a source node, and means for implementing embodiments of methods of the present disclosure.

The source node 2, which for instance may comprise a computer delivering various application data upon request, comprises an input/output device 34. The input/output device 34 may comprise one or more interfaces for communication with other network nodes 3, 4, 5 of the communication network 1.

The source node 2 further comprises various components and circuitry conventionally included in such node, examples of which comprise a scheduler 35, and multiplexers. The source node 2 may further comprise a timer 36, implemented in software and/or hardware, used in some embodiments as described.

The source node 2 comprises a processor 30 comprising any combination of one or more of a central processing unit (CPU), multiprocessor, microcontroller, digital signal processor (DSP), application specific integrated circuit etc. capable of executing software instructions stored in a memory 31, which can thus be a computer program product 31. The processor 30 can be configured to execute any of the various embodiments of the method as described for instance in relation to FIG. 4.

In particular, a source node 2 of a communication network 1 is provided which is configured for handling congestion. The communication network 1 provides a communication path for traffic streams between the source node 2 and a destination node 3, wherein the source node 2 is configurable to multiplex two or more different types of traffic streams onto a single connection. The source node 2 is configured to:
- detect congestion in the communication network 1 along the communication path,
- determine whether there is a traffic differentiation in a network node along the communication path, and
- apply a connection-level congestion control for the case of determining that there is no network node performing traffic differentiation.

The source node 2 may for example be configured to perform these steps by comprising at least one processor 30 and memory 31, wherein the memory 31 contains instructions executable by the processor 30, whereby the source node 2 is operative to perform the above functions.

In an embodiment, the source node 2 is configured to apply a per-stream group congestion control for the case of a network node performing traffic differentiation, wherein a stream group comprises one or more traffic streams grouped together.

In an embodiment, the source node 2 is configured to multiplex by grouping the two or more different traffic streams into aggregate stream groups, each stream group requiring same or similar network handling.

In an embodiment, the source node 2 is configured to determine by receiving a trigger indicating use of traffic differentiation in a network node.

In a variation of the above embodiment, the trigger comprises a message from the destination node 3, the message identifying occurrence of a re-ordering of sequence numbers of packets of the connection compared to an expected ordering of the sequence numbers of the packets.

In an embodiment, the source node 2 is configured to determine whether there is a traffic differentiation in a network node of the communication network 1 by:
- transmitting packets to the destination node 3,
- receiving acknowledgment messages from the destination node 3 for the transmitted packets,
- detecting, based on sequence numbers of the acknowledgement messages, that the received acknowledgement messages arrive in an order other than the order in which the packets were transmitted.

In an embodiment, the source node 2 is configured to determine whether there is a traffic differentiation in a network node of the communication network 1 by detecting a difference between a packet loss ratio of a first type of traffic stream relative a packet loss ratio of a second type of traffic stream being above a threshold value.

In an embodiment, the source node 2 is configured to apply by using the connection-level congestion control as default congestion control and switching to a per-stream group congestion control upon determining that there is a traffic differentiation in a network node, wherein a stream group comprises one or more traffic streams grouped together.

In a variation of the above embodiment, the source node 2 is configured to apply the per-stream group congestion control for a set period of time, and to apply the connection-level congestion control again after the expiration of the set period of time is.

In an embodiment, the source node 2 is configured to determine a respective aggressiveness parameter for the connection-level congestion control and for the per-stream group congestion control such as to provide higher throughput for the connection-level congestion control than for the per-stream group congestion control in case of no traffic differentiation, wherein the aggressiveness parameter for the per-stream group congestion control comprises an aggregate aggressiveness of all per-stream group congestion controls, and configured to apply the congestion control giving the highest throughput.

In a variation of the above embodiment, the source node 2 is configured to apply the connection-level congestion control if giving a higher overall data rate for the streams than the per-stream group congestion control.

In another variation of the above embodiment, the source node 2 is configured to, configured to apply the connection-level congestion control if $$\frac{W}{RTT_{avg}} > \sum_i \frac{W_i}{RTT_{i,avg}},$$

wherein W comprises an overall window size calculated based on an overall packet losses experienced, RTTavg comprises the average round-trip time for packets of the two or more different traffic type streams, $W_i$ comprises the window sizes for different stream aggregates i, wherein a stream aggregate i comprises one or more traffic type streams grouped together, and $RTT_{i,avg}$ comprises the average round-trip time for packets of the different aggregates i.

In an embodiment, the source node 2 is configured to determine by receiving signaling from a network node indicating traffic differentiation being performed in the communication network 1.

Still with reference to FIG. 5, the memory 31 can be any combination of random access memory (RAM) and read only memory (ROM), Flash memory, magnetic tape, Compact Disc (CD)-ROM, digital versatile disc (DVD), Blueray disc etc. The memory 31 may also comprise persistent storage, which, for example, can be any single one or combination of magnetic memory, optical memory, solid state memory or even remotely mounted memory.

A data memory 33 may also be provided for reading and/or storing data during execution of software instructions in the processor 30. The data memory 33 can for instance be any combination of read and write memory (RAM) and read only memory (ROM).

The present disclosure thus also encompasses computer program 32 comprising computer program code for causing a source node 2 to perform the method e.g. as described above in relation to FIG. 4 when the computer program code is executed on at least one processor 30 of the source node 2.

The present disclosure also encompasses a computer program product 31 comprising a computer program 32 as described above, and a computer readable means on which the computer program 32 is stored.

Figure 6:
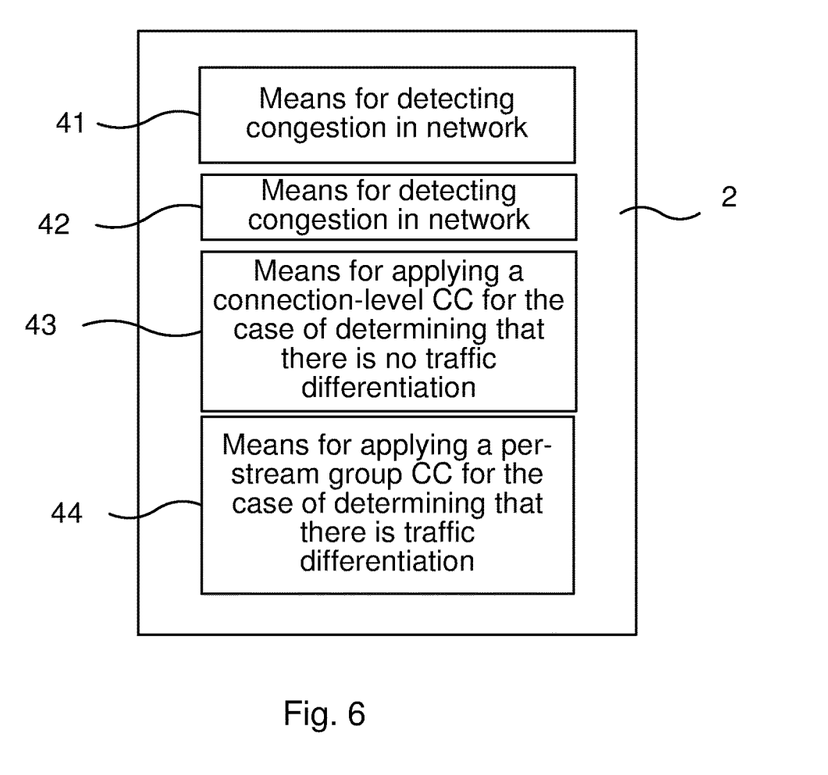
FIG. 6 illustrates a network node comprising function modules/software modules for implementing embodiments of methods of the present disclosure.

An example of an implementation using function modules/software modules is illustrated in FIG. 6, in particular illustrating a source node 2 comprising function modules and/or software modules for implementing embodiments of the method 20. The source node 2 comprises first means 41 for detecting congestion in the communication network 1. Such means 41 may for example comprise processing circuitry, adapted to do this congestion detection using program code stored in a memory.

The source node 2 comprises second means 42 for determining whether there is a traffic differentiation in a network node of the communication network. Such means 42 may for example comprise processing circuitry, adapted to determine if there is a traffic differentiation by using program code stored in a memory.

The source node 2 comprises third means 43 for applying a connection-level congestion control for the case of determining that there is no network node performing traffic differentiation. Such means 43 may for example comprise processing circuitry, adapted to apply a connection-level congestion control if there no traffic differentiation by using program code stored in a memory.

The source node 2 may comprise yet additional means for carrying out any of the steps of the various embodiments of the method 20. For example, means 44 may be provided for applying a per-stream group congestion control for the case of a network node performing traffic differentiation, wherein a stream group comprises one or more traffic streams grouped together. Such means 44 may for example comprise processing circuitry, adapted to apply a per-stream group congestion control if there is a traffic differentiation by using program code stored in a memory.

The means 41, 42, 43, 44 as well as any additional means indicated above may thus be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for handling congestion performed in a source node of a communication network, the communication network providing a communication path for traffic streams between the source node and a destination node, wherein the source node multiplexes two or more different types of traffic streams onto a single connection, the method comprising:

detecting congestion in the communication network along the communication path;

determining whether there is a traffic differentiation in a network node along the communication path; and applying a connection-level congestion control for a case of determining that there is no network node performing traffic differentiation, wherein applying the connection-level congestion control comprises determining a respective aggressiveness parameter for the connection-level congestion control and for a per-stream group congestion control in order to provide higher throughput for the connection-level congestion control than for the per-stream group congestion control in case of no traffic differentiation, wherein the aggressiveness parameter for the per-stream group congestion control comprises an aggregate aggressiveness of all per-stream group congestion controls, and applying the congestion control giving the highest throughput and the connection-level congestion control is applied if $$\frac{W}{RTT_{avg}} > \sum_i \frac{W_i}{RTT_{i,avg}},$$

wherein W comprises an overall window size calculated based on an overall packet losses experienced, RTTavg comprises an average round-trip time for packets of the two or more different types of traffic streams, $W_i$, comprises window sizes for different stream aggregates i, wherein a stream aggregate i comprises one or more traffic type streams grouped together, and $RTT_{i,avg}$ comprises an average round-trip time for packets of the different aggregates i.

2. The method as claimed in claim 1, comprising applying a per-stream group congestion control for a case of a network node performing traffic differentiation, wherein a stream group comprises one or more traffic streams grouped together.

3. The method as claimed in claim 1, wherein the multiplexing comprises grouping the two or more different types of traffic streams into aggregate stream groups, each stream group requiring same or similar network handling.

4. The method as claimed in claim 1, wherein the determining comprises receiving a trigger indicating use of traffic differentiation in a network node.

5. The method as claimed in claim 4, wherein the trigger comprises a message from the destination node, the message identifying occurrence of a re-ordering of sequence numbers of packets of the connection compared to an expected ordering of the sequence numbers of the packets.

6. The method as claimed in claim 1, wherein the determining comprises:

transmitting packets to the destination node;

receiving acknowledgment messages from the destination node for the transmitted packets; and detecting, based on sequence numbers of the acknowledgement messages, that the received acknowledgement messages arrive in an order other than the order in which the packets were transmitted.

7. The method as claimed in claim 1, wherein the determining comprises detecting a difference between a packet loss ratio of a first type of traffic stream relative a packet loss ratio of a second type of traffic stream being above a threshold value.

8. The method as claimed in claim 1, wherein the applying comprises using the connection-level congestion control as default congestion control and switching to a per-stream group congestion control upon determining that there is a traffic differentiation in a network node, wherein a stream group comprises one or more traffic streams grouped together.

9. The method as claimed in claim 8, wherein the per-stream group congestion control is applied for a set period of time, and after expiration of the set period of time the connection-level congestion control is again applied.

10. The method as claimed in claim 1, wherein the connection-level congestion control is applied if giving a higher overall data rate for the two or more different types of traffic streams than the per-stream group congestion control.

11. The method as claimed in claim 1, wherein the determining comprises receiving signaling from a network node indicating traffic differentiation being performed in the communication network.

12. A source node of a communication network configured for handling congestion, the communication network providing a communication path for traffic streams between the source node and a destination node, wherein the source node is configurable to multiplex two or more different types of traffic streams onto a single connection, wherein the source node comprises a processor configured to:
   detect congestion in the communication network along the communication path;
   determine whether there is a traffic differentiation in a network node along the communication path;
   apply a connection-level congestion control for a case of determining that there is no network node performing traffic differentiation;
   determine a respective aggressiveness parameter for the connection-level congestion control and for a per-stream group congestion control in order to provide higher throughput for the connection-level congestion control than for the per-stream group congestion control in case of no traffic differentiation, wherein the aggressiveness parameter for the per-stream group congestion control comprises an aggregate aggressiveness of all per-stream group congestion controls, and configured to apply the congestion control giving the highest throughput and
   apply the connection-level congestion control if $$\frac{W}{RTT_{avg}} > \sum_i \frac{W_i}{RTT_{i,avg}},$$

wherein W comprises an overall window size calculated based on an overall packet losses experienced, RTTavg comprises an average round-trip time for packets of the two or more different types of traffic streams, $W_i$ comprises window sizes for different stream aggregates i, wherein a stream aggregate i comprises one or more traffic type streams grouped together, and $RTT_{i,avg}$ comprises an average round-trip time for packets of the different aggregates i.

13. The source node as claimed in claim 12, configured to apply a per-stream group congestion control for a case of a network node performing traffic differentiation, wherein a stream group comprises one or more traffic streams grouped together.

14. The source node as claimed in claim 12, configured to multiplex by grouping the two or more different types of traffic streams into aggregate stream groups, each stream group requiring same or similar network handling.

15. The source node as claimed in claim 12, configured to determine by receiving a trigger indicating use of traffic differentiation in a network node.

16. The source node as claimed in claim 15, wherein the trigger comprises a message from the destination node, the message identifying occurrence of a re-ordering of sequence numbers of packets of the connection compared to an expected ordering of the sequence numbers of the packets.

17. The source node as claimed in claim 12, configured to determine whether there is a traffic differentiation in a network node of the communication network by:
   transmitting packets to the destination node;
   receiving acknowledgment messages from the destination node for the transmitted packets; and
   detecting, based on sequence numbers of the acknowledgement messages, that the received acknowledgement messages arrive in an order other than the order in which the packets were transmitted.

18. The source node as claimed in claim 12, configured to determine whether there is a traffic differentiation in a network node of the communication network by detecting a difference between a packet loss ratio of a first type of traffic stream relative a packet loss ratio of a second type of traffic stream being above a threshold value.

19. The source node as claimed in claim 12, configured to apply by using the connection-level congestion control as default congestion control and switching to a per-stream group congestion control upon determining that there is a traffic differentiation in a network node, wherein a stream group comprises one or more traffic streams grouped together.

20. The source node as claimed in claim 19, wherein the processor is configured to apply the per-stream group congestion control for a set period of time, and to apply the connection-level congestion control again after the expiration of the set period of time.

21. The source node as claimed in claim 12, configured to apply the connection-level congestion control if giving a higher overall data rate for the one or more traffic streams than the per-stream group congestion control.

22. The source node as claimed in claim 12, configured to determine by receiving signaling from a network node indicating traffic differentiation being performed in the communication network.

* * * * *